E. G. BURR.
ADMIXTURE OF METALS OR SUBSTANCES FOR ALLOYING.
APPLICATION FILED OCT. 3, 1917.
1,315,208.
Patented Sept. 9, 1919.
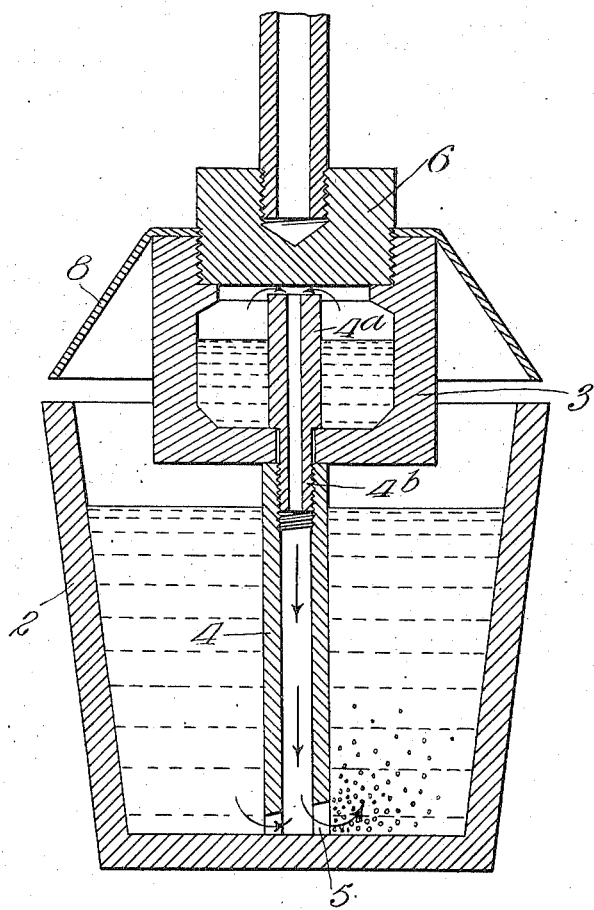
INVENTOR
EDMUND GODFREY BURR
BY ATTORNEY

UNITED STATES PATENT OFFICE.

EDMUND GODFREY BURR, OF MONTREAL, QUEBEC, CANADA.

ADMIXTURE OF METALS OR SUBSTANCES FOR ALLOYING.

1,315,208.　　　　　　　Specification of Letters Patent.　　　Patented Sept. 9, 1919.

Application filed October 3, 1917.　Serial No. 194,490.

*To all whom it may concern:*

Be it known that I, EDMUND GODFREY BURR, a subject of the King of Great Britain, and resident of the city of Montreal, Province of Quebec, Canada, have invented certain new and useful Improvements in the Admixture of Metals or Substances for Alloying, and do hereby declare the following to be a full, clear, and exact description of same.

This invention relates to the introduction of a volatile metal or substance into heated molten metal or substance for the alloying of the metals or substances, the invention appertaining particularly to cases wherein the volatile substance has a boiling point temperature approximating or lower than the melting point temperature of the heated molten substance, and the object of the invention is to accomplish the admixture of the volatile substance and the molten metal in a simpler and more efficient manner and under better control than heretofore.

As the boiling point temperature varies with different volatile substances that may be used and as it is desired to avoid even an approach to sudden vaporization, I so regulate the rate of heating of the volatile substance independently of the heat regulation of the molten substance, that the vaporization takes place gradually thus avoiding sudden and violent displacement of the molten substance upon the introduction of the vapor.

In the use of a vaporizing vessel exposed to the heat of the molten substance according to my invention this regulation is carried out by varying, in accordance with the boiling point temperature of different substances, the distance between the vaporizing vessel and the molten substance and so varying the intensity of the heat to which the volatile substance is exposed, the higher the boiling point temperature of the substance the closer the containing vessel being to the melt.

Even in the use of a volatile substance of normally very low boiling point temperature its rate of heating to boiling point temperature is retarded and sudden vaporization avoided by artificially raising the boiling point temperature. This is effected through an increase of pressure in the vaporizing vessel set up by having the vaporizing vessel in communication with the vessel containing the melt and at a point below the surface plane of the latter whereby the pressure to which the volatile substance is exposed is proportionately higher than normal according to the amount of head of metal above the communicating point.

An apparatus for carrying out my improved method is illustrated in vertical section by the accompanying drawing which forms a part of this specification and in which the same reference characters indicate the same parts.

Referring to the drawings, 2 indicates a crucible for containing the molten substance and 3 a retort for the volatile substance. The retort is constructed of material having low thermic conductivity to avoid rapid conduction of heat and is located over and above the level of the molten substance in the crucible. A tube 4 of refractory material leads from a point in the retort above the fluid level of the substance therein to a point at or near the bottom of the crucible, the upper end of the tube being open to the interior of the retort and the lower end open at 5 to the interior of the crucible, such open end or port 5 being below the surface level of the molten substance in crucible 2.

Upon charging the retort with the desired substance, for instance phosphorus, and the crucible with copper for example, the former is closed by a gas-tight plug 6 and the crucible heated in the usual manner to melt the copper. The heat of the copper then heats the retort bringing the phosphorus to the boiling point and volatilizing same, the rate of vaporization being retarded in proportion to the amount of head of melt above port 5 and the consequent pressure set up in retort 3 acting to raise the boiling point temperature of the volatile substance. As the vapor pressure increases within the retort the vapor is forced down through tube 4 and through port 5 into the copper.

The tube 4 supports the retort and is of such a length as to position same above the surface plane of the molten copper so that the phosphorus is first vaporized outside the melt and the vapor then conveyed past the surface plane of the latter before the initial contact therewith takes place.

In order to vary the distance of the retort away from the copper melt I prefer to construct the tube 4 with an upper permanent portion 4ª and a lower replaceable portion 4. The portion 4ª projects upwardly above the liquid level of the phosphorus and has a screw-threaded shank 4ᵇ passed downwardly through an opening in the bottom of the retort. The shank projects downwardly from the retort and has the portion 4, which is interiorly screw-threaded at the top, screwed thereto. The length of portion 4 employed will vary in accordance with the boiling point temperature of the volatile substance used and the distance the retort should be positioned above the copper melt to secure the desired rate of vaporization, the screw-threaded connection enabling a portion of the required length to be readily attached.

If desired the crucible and retort can be covered by a hood 8 to confine the heat about the retort.

What I claim is as follows:

1. The method of producing an alloy from a volatile substance and a metal, which consists in heating the metal to a molten state in a crucible, confining the volatile substance in a retort and arranging such retort in a predetermined position with relation to the crucible and the molten metal therein whereby the volatile substance may be vaporized at a definite rate of vaporization by the heat from the molten metal, and permitting the resulting vapor to enter and permeate such molten metal.

2. The method of producing an alloy from a volatile substance and a metal, which consists in heating the metal to a molten state in a crucible, confining the volatile substance in a retort, arranging such retort in a predetermined position with relation to the crucible and the molten metal therein and subjecting the volatile substance to the pressure set up by the head of such molten metal whereby the volatile substance may be vaporized at a definite rate of vaporization by the heat from the molten metal, and permitting the resulting vapor to enter and permeate such molten metal.

3. The method of producing an alloy from a volatile substance and a metal, which consists in heating the metal to a molten state in a crucible, confining the volatile substance in a retort, arranging the retort— according to the boiling point temperature of the volatile substance therein—in such a position with relation to the molten metal as to be heated thereby at a definite rate of vaporization, and permitting the resulting vapor to enter and permeate such molten metal.

4. An apparatus for use in introducing a volatile substance into a molten metal, comprising: a crucible for containing the molten metal; means for heating such crucible; a closed retort for containing the volatile substance and so positioned with relation to the crucible and the molten metal therein as to be heated thereby, and a tubular element affording a passageway from a point near the top of the retort through the bottom thereof to a point below the level of the molten metal in the crucible, a portion of such tubular element being of a length to extend from the bottom of the retort to the bottom of the crucible and determine the position of the retort with relation to the surface level of the molten metal in the crucible.

5. An apparatus for use in introducing a volatile substance into a molten metal, comprising: a crucible for containing the molten metal; means for heating such crucible; a closed retort for containing the volatile substance and so positioned with relation to the crucible and the molten metal therein as to be heated thereby, and a tubular element affording a passageway from a point near the top of the retort through the bottom thereof to a point below the level of the molten metal in the crucible, such tubular element being variable as to length to permit adjustment of the retort with relation to said molten metal.

6. An apparatus for use in the introduction of a volatile substance into a molten substance, comprising a crucible for containing the molten substance, a closed retort for containing the volatile substance positioned above the crucible and having an opening in the bottom, a tube portion with a screw-threaded lower end passed downwardly through said opening, the upper end of the tube portion terminating at a point above the fluid level of the substance in the retort and the screw-threaded end protruding from the bottom of the retort and a second tube portion screwed upon said protruding end and extending downwardly into the crucible to a point below the fluid level of the substance in the latter.

7. The method of producing an alloy from a volatile substance and a metal, which consists in heating the metal to a molten state in a crucible, confining the volatile substance in a retort constructed and arranged in such a manner that the volatile substance may be vaporized at a definite rate of vaporization by the heat from the molten metal, and permitting the resulting vapor to enter and permeate such molten metal.

In testimony whereof I have signed my name to this specification.

EDMUND GODFREY BURR.